(12) United States Patent
Burmeister et al.

(10) Patent No.: US 7,901,759 B2
(45) Date of Patent: Mar. 8, 2011

(54) FLAT STRUCTURE THAT IS AT LEAST PARTIALLY PROVIDED WITH A SELF-ADHESIVE SUBSTANCE

(75) Inventors: Axel Burmeister, Buchholz (DE); Jochen Fiencke, Hamburg (DE); Christoph Nagel, Hamburg (DE)

(73) Assignee: tesa SE, Hamburg (DE)

( * ) Notice: Subject to any disclaimer, the term of this patent is extended or adjusted under 35 U.S.C. 154(b) by 437 days.

(21) Appl. No.: 11/571,007

(22) PCT Filed: Jun. 14, 2005

(86) PCT No.: PCT/EP2005/052721
§ 371 (c)(1),
(2), (4) Date: Jan. 26, 2007

(87) PCT Pub. No.: WO2006/003081
PCT Pub. Date: Jan. 12, 2006

(65) Prior Publication Data
US 2008/0286536 A1    Nov. 20, 2008

(30) Foreign Application Priority Data
Jul. 2, 2004    (DE) .................... 10 2004 032 391

(51) Int. Cl.
*B32B 7/10* (2006.01)
(52) U.S. Cl. .................... 428/198; 428/201; 156/324.4
(58) Field of Classification Search .................... 428/198
See application file for complete search history.

(56) References Cited

U.S. PATENT DOCUMENTS

| | | | |
|---|---|---|---|
| 2,510,120 A | 6/1950 | Leander | |
| 5,344,693 A * | 9/1994 | Sanders | 428/167 |
| 6,171,648 B1 * | 1/2001 | Himmelsbach et al. | 427/208.2 |
| 6,858,110 B1 * | 2/2005 | Himmelsbach et al. | 156/291 |

FOREIGN PATENT DOCUMENTS

| | | |
|---|---|---|
| DE | 974178 | 10/1960 |
| DE | 2365532 A1 | 8/1975 |
| DE | 2610135 A1 | 8/1977 |
| DE | 2834441 A1 | 2/1979 |
| DE | 3346100 A1 | 7/1985 |
| DE | 4237252 C2 | 5/1994 |
| DE | 4308649 | 9/1994 |
| DE | 19751873 A1 | 8/1999 |
| EP | 0353972 B1 | 2/1990 |
| EP | 0725809 | 5/1995 |
| EP | 1045015 A | 10/2000 |
| GB | 836097 | 3/1961 |
| JP | 09-224895 * | 9/1997 |
| WO | 91 13752 A | 9/1991 |
| WO | 2004 087337 A | 10/2004 |

* cited by examiner

*Primary Examiner* — Mark Ruthkosky
*Assistant Examiner* — Sathavaram I Reddy
(74) *Attorney, Agent, or Firm* — Norris McLaughlin & Marcus, P.A.

(57) ABSTRACT

The invention relates to a flat structure that is at least partially provided with a self-adhesive substance, the latter being present on a first surface layer of the flat structure in the form of a plurality of geometric bodies. According to the invention, the surface of at least some of the geometric bodies is at least partially treated in such a way that the treated part of the surface has a lower degree of adhesion than the non-treated self-adhesive substance.

11 Claims, 3 Drawing Sheets

FLAT STRUCTURE THAT IS AT LEAST PARTIALLY PROVIDED WITH A SELF-ADHESIVE SUBSTANCE

This application is a 371 of PCT/EP2005/052721, filed Jun. 15, 2005, which claims foreign priority benefit under 35 U.S.C. §119 of the German Patent Application No. DE 10 2004 032 391.7 filed Jul. 2, 2004.

The invention relates to sheetlike structures provided at least partially with self-adhesive mass, the self-adhesive mass being present in the form of a multiplicity of geometric structures on a first a real layer of the sheetlike structure.

The partial coating of carrier materials with pressure-sensitive self-adhesive masses is a known technology. For instance U.S. Pat. No. 2,510,120 A describes patterned coating in linear stripes or other geometries for the purpose of improved redetachability. DE 26 10 135 A1 describes specific die printing of adhesives, and DE 28 34 441 A1 a hot-melt process for applying a linear stripe. Furthermore, DE 23 65 532 A1 describes a hot-melt process for applying adhesive contours by way of printing plates/forms.

Self-adhesive tapes with adhesive-free sites in dot matrix form are specified in DE 974 178. Adhesive can also be applied by screen printing (DE 42 37252 C2), in which case the domes of adhesive are also different-sized and/or differently distributed (EP 0 353 972 B1), the base area of the individual dots is smaller in comparison to their projection area (DE 197 51 873 A1) or the adhesive is applied from dispersion (DE 33 46 100 A1). DE 43 08 649 describes the application of coherent webs of adhesive in machine and cross directions by gravure printing.

It is also possible, moreover, for the mass to be applied wholly and only then shaped by way of relief rolls (GB 836097) or by way of a subsequently applied textured liner. The latter process has been employed, for example, for numerous double-sided self-adhesive tapes that have been on the market for years, and is also described in EP 0 725 809 B1.

As carrier materials a very wide variety of materials have already been described. Examples of those employed include film, foam, woven, paper, knitted, nonwoven or gel carriers.

The carrier may be in single-layer or multilayer form.

The invention, then, is based on the object of providing a self-adhesive sheetlike structure (adhesive tape, label or the like) which in the course of its use—as a laser security label, for example—under slight applied pressure exhibits relatively little or no tack and/or relatively little or no bond strength and develops its bond strength only after significant applied pressure.

This object is achieved by means of a carrier material which has been rendered partially adhesive on at least on one side, as described hereinbelow.

The invention accordingly provides a sheetlike structure at least partially provided with self-adhesive mass, the self-adhesive mass being present in the form of a multiplicity of geometric structures on a first areal layer of the sheetlike structure, wherein additionally the surface of at least some of the geometric structures has been at least partly treated such that the treated part of the surface has a lower tack than the untreated self-adhesive mass.

The treatment of the surface "deactivates" the self-adhesiveness of the surface regions treated in this way, whereas preferably untreated regions remain in which the self-adhesive mass retains its adhesiveness. The deactivation may go as far as the stage in which adhesiveness is no longer present in the regions treated.

One embodiment of the invention is such that the surface of the sheetlike structure has been wholly treated, so that there are no regions remaining in which the self-adhesive mass retains its adhesiveness.

A sheetlike structure treated in the above manner (partly or wholly deactivated) has on its surface little or no adhesiveness when applied with little pressure to a substrate. The contact between the sheetlike structure and the substrate takes place at this stage primarily in the treated, deactivated regions of low adhesiveness.

If the pressure applied is increased, then in the partially treated sheetlike structure the untreated, adhesive regions come into contact with the substrate, since the geometric structures undergo deformation ("are pressed flat"). There may also be rupture of the deactivated regions, so that here as well the self-adhesive mass emerges and raises the adhesiveness of the sheetlike structure.

The rupturing of the deactivated regions in the case of the wholly treated sheetlike structures causes them, when the applied pressure is sufficient, to exhibit a sufficiently high adhesiveness.

Parts at least of the surface of the self-adhesive are treated (deactivated), i.e., converted into a state in which the adhesive geometries significantly reduce or lose entirely their tack and their bond strength. This deactivation takes place at the surface of the self-adhesive geometries, with particular preference at the tips furthest from the carrier of some or all of the geometric self-adhesive structures (preferably at their "peaks"). Depending on the implementation of the treatment, however, the deactivation may also exhibit a certain depth of penetration into the self-adhesive mass.

The percentage fraction of the surface within which the latter is deactivated depends on the nature of the application and on the bond strength and tack of the untreated adhesive. The higher the bond strength and the tack of the untreated mass, advantageously, the greater the percentage fraction of the surface deactivated.

In one advantageous embodiment of the invention all of the geometric structures are partially treated, so that the treated regions are deactivated. In another advantageous embodiment of the invention all of the geometric structures are wholly treated (deactivated).

Preferably 1% to 100% of the adhesive's surface is treated, more preferably 10% to 80%, and very preferably 15% to 75%.

In addition it is possible for the adhesive geometries to have different heights, and in this case, with specific types of treatment, preferably only the relatively high adhesive geometries are partially deactivated. Specifically, the heights of the domes may be different: preferably 1% to 95% of the domes have a relatively large height, more preferably 20% to 80%, and very preferably 30% to 60%. At the same time it is possible to vary the degree of deactivation as desired.

Deactivation may take place mechanically, by way of example of the application of a covering layer of coating materials, inks, powders, fibers, other particles, composed in each case of all conceivable natural and/or chemical substances. Advantageous methods in this context include spraying on substances, immersion in a bath, coating via a wetted roller, or other prior-art coating methods.

A further possibility for the deactivation of the self-adhesive mass is the thermal, chemical or physical crosslinking of regions of the self-adhesive mass geometries. By way of the specific control of, for example, the temperature, a radiation dose and radiation wavelength, or a chemical concentration in particular subregions of the self-adhesive mass geometries, for example, it is possible for crosslinking of the adhesive polymers in those subregions to take place to a degree at which the adhesive virtually to completely loses its tack and bond strength.

The geometric structures may in particular have been applied to a further layer of an adhesive, which is identical to or different from the self-adhesive mass that forms the geometric structures.

Very advantageously the first areal layer of the sheetlike structure may also be a carrier material, so that the geometric structures are applied to this carrier material. The carrier material may with particular advantage take the form of a rigid or elastic film, foam, woven, paper, knitted, nonwoven or gel carrier or may also be a coating-material layer.

For specific applications such as security labels or laser labels there are particular requirements imposed on the carrier. The materials must be capable of being marked irreversibly, with particular preference by laser; must be sufficiently flexible for reliable, damage-free adherence of the labels, but at the same time sufficiently brittle that, after being adhered, they can no longer be detached without destruction. Another requirement is an adequate heat stability. With preference, coating materials are employed here, particular preference being given to a composite of two different-colored coating materials, of which the top layer can be burnt off by a laser so that the bottom layer, which is differently colored, shows through.

All of the aforementioned materials can also be used in the product constructions described here. Furthermore, all rigid and elastic materials comprising synthetic and natural raw materials, and also carrier-less systems, can be used, the latter being composed of transfer adhesive alone. Additionally, any multi-layer composite constructions, including those of different materials.

Additionally it is possible for these materials to be pre-treated and/or aftertreated. Common treatments are corona, flame, fluorine, hydrophobicizing, calendering, thermal conditioning, laminating, punching, printing, embossing, and lining.

As self-adhesive masses which can be used for the inventive concept, especially for the coating of the carrier material, it is possible with advantage to use thermoplastic hot-melt adhesives based on natural and/or synthetic rubber and/or on other synthetic polymers such as acrylates, methacrylates, polyurethanes, polyolefins, polyvinyl derivatives, polyesters and/or silicones with corresponding additives such as tackifier resins, plasticizers, stabilizers and/or other auxiliaries, where necessary.

The softening point of the self-adhesive masses is preferably higher than 50° C., since the application temperature is generally at least 90° C., preferably between 120° C. and 150° C. or 180° C. and 220° C. in the case of silicones. After-crosslinking by means of UV and/or electron-beam irradiation may be appropriate, if desired, in order to set particularly advantageous properties in the hot-melt adhesives.

Hot-melt adhesives based on block copolymers, in particular, are notable for their diverse opportunities for variation, since the control adaptation of the glass transition temperature of the self-adhesive mass as a result of the selection of the tackifiers, plasticizers, polymer molecule size and molecular distribution of the starting components ensures the necessary function-compatible adhesive bonding for a wide variety of applications. These adhesives, accordingly, can be used with advantage.

The high shear strength of the hot-melt adhesive is achieved as a result of the high cohesiveness of the polymers. The effective tack is a result of the range of tackifiers and plasticizers that is used.

For particularly strongly adhering systems the hot-melt adhesive is based preferably on block copolymers, especially A-B, A-B-A block copolymers or blends thereof. The hard phase A is principally polystyrene or its derivatives, and the soft phase B comprises ethylene, propylene, butylene, butadiene, isoprene or mixtures thereof, and in that case with particular preference ethylene and butylene or mixtures thereof.

Polystyrene blocks, however, may also be present in the soft phase B, at up to 20% by weight. The overall styrene fraction, though, should always be lower than 35% by weight.

The controlled blending of diblock and triblock copolymers is particularly advantageous, preference being given to a diblock copolymer fraction of less than 80% by weight.

In one advantageous embodiment the hot-melt adhesive has the composition indicated below:
10% to 90% by weight of block copolymers,
5% to 80% by weight of tackifiers such as oils, waxes, resins and/or mixtures thereof, preferably mixtures of resins and oils,
up to 60% by weight of plasticizers,
up to 15% by weight of additives,
up to 5% by weight of stabilizers.

The aliphatic or aromatic oils, waxes, and resins used as tackifiers are preferably hydrocarbon oils, waxes and resins. Plasticizers used are medium-chain or long-chain fatty acids and/or their esters. These additions serve to establish the adhesion properties and the stability. If desired, further stabilizers and other auxiliaries are employed.

Filling the adhesive with mineral fillers, fibers or hollow or solid microspheres is possible.

The hot-melt adhesive has a softening point of above 70° C., preferably 95° C. to 120° C.

Sheetlike structures used industrially, in particular, are subject to stringent requirements in terms of the adhesive properties. For ideal application the hot-melt adhesive ought to possess a high tack. So that there is no slipping, moreover, the hot-melt adhesive needs to have a high shear strength.

The controlled reduction in the glass transition temperature of the adhesive as a consequence of the selection of the tackifiers, of the plasticizers and also of the polymer molecule size and the molecular distribution of the starting components achieves the necessary, functionally compatible adhesive bonding with the respective bonding substrates and with the reverse of the carrier.

The high shear strength of the adhesive employed here is achieved as a result of the high cohesiveness of the block copolymer. The effective tack is a result of the range of tackifiers and plasticizers that is used.

The product properties such as tack, glass transition temperature, and shear stability can be quantified readily with the aid of a dynamomechanical frequency measurement. This is done using a rheometer controlled by shear stress.

The results of this measurement method give information on the physical properties of a substance, by taking into account the viscoelastic component. In this case, at a preset temperature, the hot-melt self-adhesive mass is set in oscillation between two plane-parallel plates with variable frequencies and low deformation (linear viscoelastic region). Via a pickup control unit, with computer assistance, the quotient ($Q=\tan \delta$) between the loss modulus (G", viscous component) and the storage modulus (G', elastic component) is found.

$$Q = \tan \delta = G''/G'$$

A high frequency is chosen for the subjective sensing of the tack, and a low frequency for the shear strength.

A high numerical value denotes a high tack and a relatively low shear stability.

The glass transition temperature is the temperature at which amorphous or partially crystalline polymers undergo transition from the liquid or rubber-elastic state into the hard-elastic or glassy state, or vice versa (cf., for example, Römpp Chemie-Lexikon, 9th ed., volume 2, page 1587, Georg Thieme Verlag Stuttgart—New York, 1990). It corresponds to the maximum of the temperature function at a given frequency.

The hot-melt adhesives are preferably formulated so that at a frequency of 0.1 rad/s they have a dynamic-complex glass transition temperature of less than 15° C., preferably of 0° C. to −30° C., with very particular preference of −3° C. to −15° C.

Preference is given in accordance with the invention to hot-melt adhesives for which the ratio of the viscous component to the elastic component at a frequency of 100 rad/s at 25° C. is greater than 0.7, or to hot-melt self-adhesive masses for which the ratio of the viscous component to the elastic component is a frequency of 0.1 rad/s at 25° C. is less than 0.4, preferably between 0.35 and 0.02, with very particular preference between 0.3 and 0.1.

The partial application of the adhesive to the carrier material is advantageous, by means for example of half tone printing, thermal screen printing, thermal flexographic printing or gravure printing. In the case of carrier materials treated adhesively in full or partial lines and also by a nozzle technique, the adhesive can be shaped subsequently using relief rollers and/or textured liners. It is likewise possible for there to be partial application of a second adhesive to a pre-applied partial or full line of the first adhesive, with different properties where appropriate. It is additionally possible for there to be a second or further partial application of the first adhesive to a coating which has already been applied, in particular a whole coating, of the same adhesive.

In one preferred embodiment the self-adhesive mass is applied in the form of polygeometric domes to the carrier. The domes can have different shapes. Flattened hemispheres are preferred; depending on application, however, the ratio of diameter to height can also be less than 1. Also possible, furthermore, is the printed application of other shapes and patterns on the carrier material—for example, a printed image in the form of alphanumeric character combinations or patterns such as grids, stripes, and zigzag lines.

Furthermore, for example, the self-adhesive mass can also be applied by spraying, producing a more or less irregular pattern of application.

The adhesive can be distributed uniformly on the carrier material, or alternatively it can be applied with a thickness or density which varies over the area, as appropriate to the function of the product.

Given an appropriate choice of the geometries, the partial application of adhesive may make it possible for gases and/or liquids to be removed, even after the application of the sheetlike structure, by virtue of controlled channels being left behind. This diverting of gases and/or liquids may take place not only parallel to the bond area, through the channels to the edge of the sheetlike structure, but also, in deviation, at an angle from the bond area, into or through a permeable carrier material.

A self-adhesively treated sheetlike structure can be produced in a variety of ways. The carrier material or the first areal layer can not only be coated directly with an adhesive but can also be coated indirectly via an auxiliary carrier. The latter process is characterized by a total of three steps.

In the first step the geometric structures formed from hot-melt adhesive are applied by means of half tone, thermal screen or gravure printing or by the nozzle process to an auxiliary carrier; in the second step the auxiliary carrier bearing the structures is guided onto the carrier material; and finally the structures are transferred from the auxiliary carrier to the carrier material.

The term "auxiliary carrier" is intended to denote conventional, continuous webs of different materials, and also apparatus such as transfer rollers.

Depending on the carrier material and its temperature sensitivity, however, the hot-melt adhesive can be applied directly to the carrier material.

Subsequent calendering of the coated product and/or pretreatment of the carrier, such as corona irradiation, may also be advantageous for better anchoring of the adhesive layer. Moreover, treatment of the hot-melt adhesive by electron-beam aftercrosslinking or by UV irradiation may lead to an improvement in the desired properties.

The principle of thermal screen printing consists in the use of a rotating, heated, seamless, drum-shaped, perforated, cylindrical screen which is fed via a nozzle with the preferred hot-melt adhesive. A specially shaped nozzle lip (circular or square-section coating bar) presses the hot-melt adhesive, which is fed in via a channel, through the perforations in the screen wall onto the carrier web which is conveyed past it. This carrier web is guided by means of a backing roller against the outer jacket of the heated screen drum, at a rate which corresponds to the peripheral speed of the rotating screen drum.

In this procedure, the small domes of adhesive are formed in accordance with the following mechanism:

The pressure of the nozzle coating bar conveys the hot-melt adhesive through the screen perforations and onto the carrier material. The size of the domes formed is predetermined by the diameter of the screen perforation. The screen is lifted from the carrier in accordance with the rate of transportation of the carrier web (rotary speed of the screen drum). As a consequence of the high level of adhesion of the adhesive and of the internal cohesion of the hot-melt adhesive, the limited supply of hot-melt adhesive in the perforations is drawn in sharp definition from the base of the domes, which is already adhering to the carrier, and is conveyed onto the carrier by the pressure of the coating bar.

Following the end of this transportation, the more or less highly curved surface of the dome forms over the predefined base area in dependence on the rheology of the hot-melt adhesive. The height-to-base ratio of the dome depends on the ratio of the perforation diameter to the wall thickness of the screen drum and on the physical properties (rheology, surface tension, and contact angle on the carrier material) of the self-adhesive mass.

For the screen in thermal screen printing, the web-to-hole ratio can be less than 3:1, preferably less than or equal to 1:1, in particular equal to 1:3.

The above-described mechanism of formation of the domes requires, preferentially, carrier materials that are absorbent or at least wettable by hot-melt adhesive. Nonwetting carrier surfaces must be pretreated by chemical or physical methods. This can be done by means of additional measures such as corona discharge, flame pretreatment, plasma pretreatment or coating with substances which improve wetting, such as primers, for example.

With the printing method indicated it is possible to lay down the size and shape of the domes in a defined manner. The bond strength values which are relevant for the application, and determine the quality of the products produced, are situated within very narrow tolerances when coating is carried out properly. The base diameter of the domes is chosen advantageously from 10 μm to 5000 μm, the height of the domes from 5 μm to 2000 μm, preferably from 10 μm to 1000 μm, with very particular preference 20 μm-100 μm, the low-diameter range being intended for smooth carriers, and the range of greater diameter and greater dome height being intended for rough or highly porous carrier materials.

Depending on application the adhesive can be applied in different advantageous geometries. In order to prevent unwanted clinging/sticking of the sheetlike structure prior to the actual desired adhesive bonding it is advantageous, for example, to choose geometries featuring steep sides. In the case of domes, webs or cylinders of adhesive, for example, this can be achieved by means of a large height-to-base area ratio. In that case the whole or partial deactivation of the adhesive is implemented with particular preference only in the higher regions—for example, at the tips of the adhesive geometries. This sheetlike structure (self-adhesive tape, label or the like) thus provided can be positioned and repositioned without problems, since there is a spatial separation of active self-adhesive mass with respect to the bonding substrate. As long as no pressure is applied beyond a certain threshold value, there is no clinging or sticking on a product construction of this kind. The threshold value, i.e., the required applied pressure, depends on factors which include the geometry, the rheology, and the degree of and form of deactivation, and can be adjusted by way of these factors.

Bonding can take place only when this barrier is overcome by significant applied pressure. As a result of this applied pressure the self-adhesive mass deforms in such a way that the bonding substrate comes into contact with the active self-adhesive mass.

In the case of other applications, where reliable ultimate bonding is a principal requirement, it may be more advantageous to select flatter geometries and to select smaller areas of partial deactivation.

The positioning of the domes on the carrier is laid down in a defined manner by the geometry of the applicator unit, the gravure geometry or screen geometry for example, which can be varied within wide limits. With the aid of the parameters indicated it is possible, by way of adjustable variables, to set with very great precision the desired profile of properties of the coating, tailored to the different carrier materials and applications.

The percentage fraction of the area coated with the self-adhesive mass geometries ought to be at least 20% and can range up to approximately 95%. This can be achieved, where appropriate, by means of multiple application, in which case it is also possible to employ self-adhesive masses having different properties, where appropriate.

A controlled temperature regime and/or the introduction of radiative energy, mechanical energy or secondary energy during production make it possible in the case of thermoplastic self-adhesive masses to modify the geometry of the geometric structures, with the head diameters and base diameters being variable within wide limits.

With preference it is also possible to operate a controlled temperature regime at the surface of the thermoplastic or elastic primary domes, i.e., the domes applied to the auxiliary carrier, by means for example of radiative heating such as IR, by means of which it is possible to produce secondary domes which have bonding properties that are optimum for product transfer. An addition in the energy control in the material and/or on the surface of the polymers allows a great diversity of polygeometric dome shapes. For the ultimate shaping of the transferred secondary dome, a regulatable printing station (gap/pressure/temperature/speed) may be advantageous. Subsequent calendering may also be advantageous.

The profile of viscoelastic properties which is present prior to the transfer of the secondary dome in the structures of self-adhesive mass can be adjusted by controlling the heat energy from the coating operation, by the at least partial introduction of surface energy, or by the at least partial removal of heat energy, or by a combination of the methods.

The geometric structures can be divided, accordingly, into a plurality of zones which may have entirely different properties. The geometric structures applied to the auxiliary carrier, at the time of transfer onto the carrier material in the base zone, which corresponds to the part of the structure that adjoins the carrier material, have a plasticity/elasticity ratio, at a frequency of 100 rad/s of 0.4 to 50, and in the head zone, which represents the base zone opposite to the exterior portion of the structure, they have a plasticity/elasticity ratio of greater than 0.3, preferably 0.4 to 50, the plasticity/elasticity ratio in the head zone being not lower than in the base zone.

The self-adhesive mass can be applied with a weight per unit area of greater than 6 $g/m^2$, preferably between 20 $g/m^2$ and 300 $g/m^2$, with very particular preference between 30 $g/m^2$ and 180 $g/m^2$, to the carrier material. This coating may take place in two or more steps with adhesives having different properties and/or different geometries. It is also possible for the product construction, the geometries, and the properties of the adhesives to be selected such that, in the course of adhesive bonding, contact comes about between the adhesive and the bonding substrate over the full area, without inclusions of extraneous media (for example, air or liquids). Other preferred product constructions may be intended to leave channels in the adhesive even after bonding, in other words not to achieve whole-area bonding.

The application of the adhesive to the first areal layer is preferably followed by the treatment (deactivation) of the adhesive in accordance with the text above.

The textured self-adhesive mass or self-adhesive mass applied in geometric forms reduces the initial bonding area when the assembly is positioned. If there are, in addition, regions of the textured self-adhesive mass, preferably the high-lying areas, which come into contact with the bonding substrate first, and these regions have been deactivated by mechanical, chemical or physical aftertreatment, such as by subsequent imprinting of these areas with a coating material, for example, then either the self-adhesive assembly itself or a counterpiece to be adhered can be positioned without problems, since, provided there is no applied pressure, the self-adhesive mass comes into contact not at all, or only in small regions, with the bonding substrate. Only when the precise position has been found is pressure exerted on the bond area, so that the self-adhesive mass comes into contact with the bond area. Possible applications are therefore those where the sheetlike structure (self-adhesive tape, label or the like) has to be positioned precisely before being stuck down.

By means of different embodiments of the domes and/or of the degrees of deactivation it is possible to adapt the sheetlike structure to the corresponding application.

Without wishing to rule out other applications, the invention can be employed with great advantage for highly sensitive carrier materials, for example (such as brittle, tearable or easily damaged or destroyed carrier materials, for example), such as in papers and, with particular preference, laser labels (security labels). The outstanding properties of the self-adhesive carrier material of the invention suggest its use as a laser label/security label.

The sheetlike structure of the invention is additionally suitable for applications in which only selected regions of the self-adhesive tape are needed for bonding, while the other, remaining regions are not to adhere, in order not to attract any dirt/dust, for example, or not to disrupt the operation of further processing. In the printing industry, for example, self-adhesive tapes are used to mount flexographic printing plates. In this application, generally, a double-sided adhesive tape is adhered via its whole area to the printing cylinder and subsequently one or more printing plates are applied only in defined regions. The surrounding regions continue to be self-adhesive. Particularly when printing papers, these regions may become paper-dust collectors, and there it is possible for particles of dirt to accumulate, which in extreme cases may develop to a height such that they are also printed and therefore mar the printed image. The sheetlike structure of the invention is able to help here, since no dust remains clinging to the deactivated adhesive.

In addition, the sheetlike structure can be lined, after the coating operation, with an adhesive-repellent carrier material, such as siliconized paper, and hence can be protected, among other things. If the self-adhesive mass has been deactivated over its whole area, there may also be other liners needed, such as, for example, nonsiliconized films and papers or even films or papers coated with self-adhesive mass, which ensure a sufficient hold of the liner on the self-adhesive mass of the invention prior to use.

The structure is also outstandingly suitable for technical reversible fixings, which when removed do not allow any injury or damage to a variety of substrates, such as paper, plastics, glass, textiles, wood, metals or minerals.

Finally it is possible to produce technically permanent adhesive bonds which can be parted only with partial splitting of the substrate.

A number of figures will be used to illustrate advantageous embodiments of the subject matter of the invention, without thereby wishing to subject the invention to any unnecessary restriction.

Figure 1:
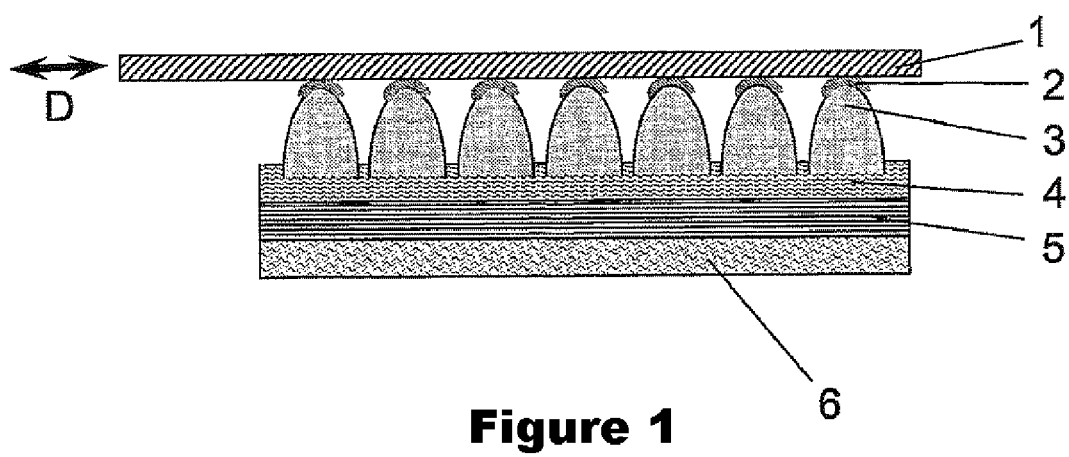
FIG. 1 shows a carrier material, coated with adhesive geometries in dome form and partially deactivated, in lateral section before the bonded state, during positioning, for example; the domes of adhesive are at a distance from one another.

FIG. 1 shows a section taken from a sheetlike structure of the invention, composed of a continuous carrier material 5 in section, which if desired can have a multilayer construction and which is coated over the whole area on both sides with self-adhesive mass 4 (base adhesive layer) and 6 (adhesive on the opposite side of the carrier). On one side, additionally, self-adhesive geometries 3 (in this case domes of self-adhesive mass) have been coated on with physical spacing. Parts of the surfaces of the self-adhesive mass domes are in the form of deactivated regions 2. A bonding substrate 1, which is placed only lightly onto the sheetlike structure (adhesive tape), does not adhere and can be shifted easily (double-headed arrow D; below, a double-headed arrow D is intended to represent the capacity for the bonded substrate to be shifted, and a deleted double-headed arrow is intended to represent the absence of a capacity for the bonded substrate 1 to be shifted).

Figure 2:
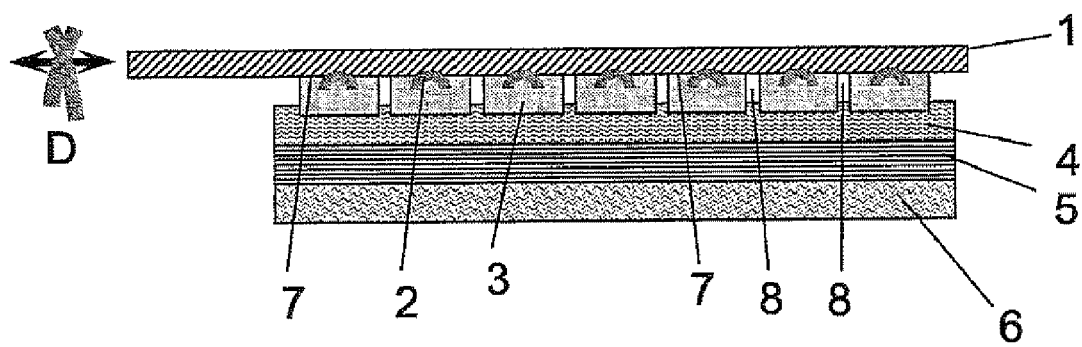
FIG. 2 shows the coated carrier material of FIG. 1 in the bonding state. The domes, deformed by the applied pressure, leave channels free through which it is possible for fluids, for example, to flow off from the bonding plane.

FIG. 2, which shows the sheetlike structure of FIG. 1 in the bonded state, serves to elucidate the mechanism: as a result of relatively strong applied pressure, the domes 3 of self-adhesive mass undergo deformation, and the contact area with the bonding substrate 1 increases to such an extent that bonding regions 7 as well make contact with the bonding substrate 1. The deactivated regions 2 are pressed into the mass. The bonded substrate 1 can no longer be shifted (or only with very great difficulty). FIG. 2 shows a version in which in the bonded state there are channels 8 left between the domes 3. Through these channels 8 it is possible, during and after bonding, for fluids to run off. Thus it is possible, for example, to prevent the formation of bubbles between the bond areas.

Figure 3:
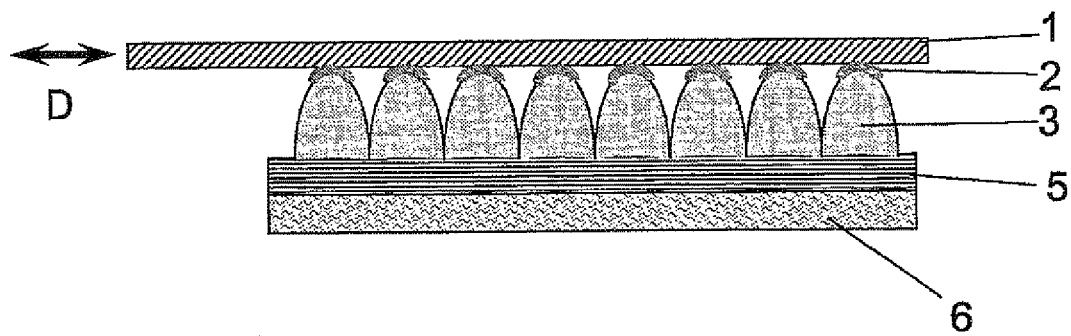
FIG. 3 shows a carrier material, coated with adhesive geometries and partially deactivated, in lateral section before the bonded state, during positioning, for example; the bases of the domes of adhesive have no distance from one another.
Figure 4:
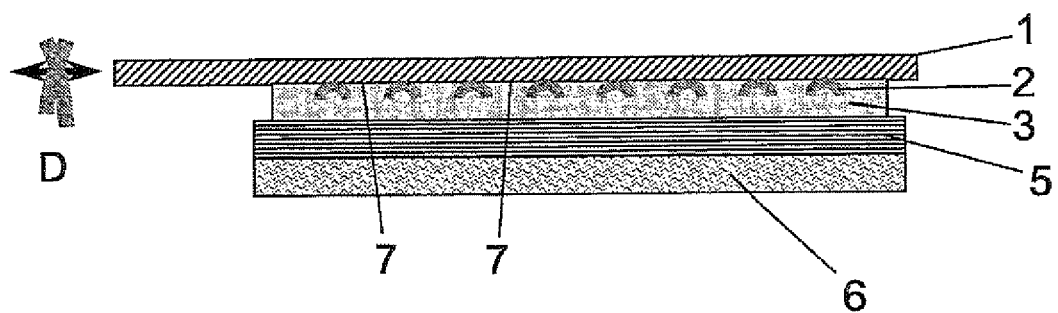
FIG. 4 shows the coated carrier material of FIG. 3 in the bonding state. The domes, deformed by the applied pressure, form a whole-area bond.

FIG. 3 shows a sheetlike structure of the invention based on a continuous carrier 5 which on one side over its whole area is coated with self-adhesive mass 6 and which if desired may have a multilayer construction. The second side of the carrier 5 is coated with self-adhesive mass geometries 3 whose surface has been partially deactivated 2. The arrangement and shape of the self-adhesive geometries 3 are such that in the bonding state (FIG. 4) there is (whole-area) bonding without the inclusion of fluids: under the action of force/applied pressure the self-adhesive mass geometries 3 undergo deformation such that bonding regions 7 as well come into contact with the bonding substrate, and the space between bond area 1 and carrier 5 is filled completely with self-adhesive mass (bonding regions 7 resulting from the deformed domes 3) and deactivated mass 2.

Figure 5:
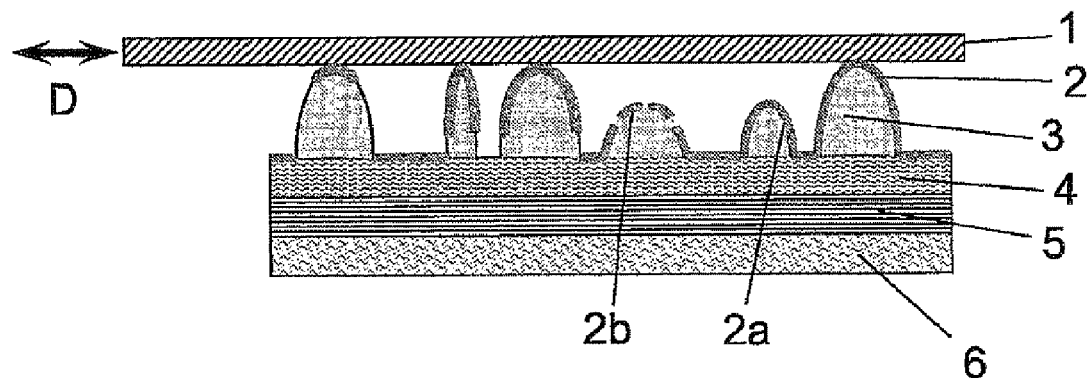
FIG. 5 shows a carrier material coated with differently shaped domes and different degrees of deactivation, in lateral section.

FIG. 5, finally, shows different-shaped domes 3 with different-sized deactivated sections 2 in lateral section, which have proven particularly advantageous. Certain regions 2a of the sheetlike structure have been deactivated over the whole area; other regions 2b only partially, in different ways.

Figure 6:
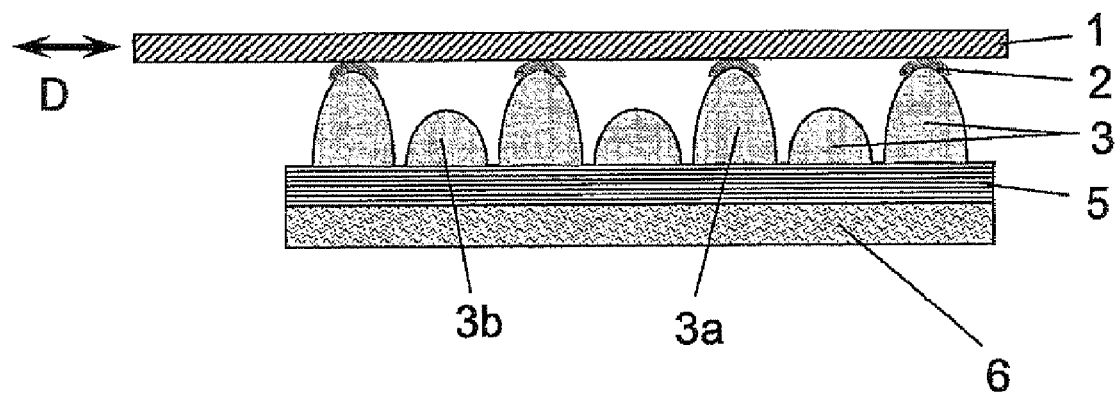
FIG. 6 shows a carrier material coated with differently shaped domes and different degrees of deactivation, in lateral section. 50% of the domes have a relatively great height and are deactivated at their tips.

FIG. 6 shows the particularly advantageous embodiment of the sheetlike structure as depicted in example 2. Some (3a) of the self-adhesive mass domes 3 have a greater height than the others, 3b. In this example 50% of the self-adhesive mass domes 3 have a greater height than the others. The high domes are distributed preferably uniformly over the sheetlike structure and are partially deactivated 2 at their tip, the point which is furthest from the carrier.

The sheetlike structure as described in FIG. 6 can likewise be furnished with a base adhesive layer 4 in analogy to that in FIG. 1.

In the text below the intention is to illustrate a self-adhesive carrier material of the invention by means of an example, again without wishing here to restrict the invention unnecessarily.

EXAMPLE 1

In accordance with the invention a single-sidedly coated self-adhesive label was produced.

The carrier employed for this label consisted of a 50 μm polyethylene terephthalate film having an ultimate tensile stress strength of greater than 150 N/15 mm and a breaking extension of less than 140%.

The self-adhesive mass was applied by thermal screen printing to the carrier, the self-adhesive mass being a hot-melt adhesive.

The composition of this hot-melt adhesive was as follows: an A-B/A-B-A block copolymer, composed of hard and soft segments, having a ratio of A-B-A to A-B of 2:1 and a styrene content of 13 mol % in the polymer; its proportion in the adhesive is 40% by weight (Kraton G)
hydrocarbon resins, with a proportion of 14.5% by weight (Super Resin HC 140)
an aging inhibitor, with a proportion of less than 0.5% by weight (Irganox).

The components employed were homogenized in a thermal mixer at 175° C.

The softening point of this adhesive was approximately 85° C. (DIN 52011), and the adhesive gave a viscosity of 2100 mPas at 150° C. (DIN 53018, Brookfield DV II, sp. 21). The glass transition temperature, by the method set out above, was −10° C.

The carrier material was coated directly at 4.2 m/min and at a temperature of 140° C. It was coated with 40 g/m², using a 25 mesh screen stencil with a 20% open area and a thickness of 200 µm.

Subsequently the self-adhesive mass applied by screen printing was coated over its whole area, by a spraying technique, with a very thin layer of coating material.

The sheetlike structure produced by this process (self-adhesive tape or label) showed no tack at all and no bond strength under only gentle applied pressure. It could therefore be positioned precisely without trouble or problem even on sensitive substrates. The choice of a transparent product construction (carrier, self-adhesive mass, and coating material) made it possible, moreover, to perceive positioning marks, for example, through the adhesive tape. After applied pressure, in contrast, the bonding strength was high. At the same time there remained air channels left between the individual domes, which guaranteed bubble-free application.

EXAMPLE 2

In accordance with the invention a single-sidedly coated self-adhesive label was produced.

The carrier employed for this label consisted of a 50 µm polyethylene terephthalate film having an ultimate tensile stress strength of greater than 150 N/15 mm and a breaking extension of less than 140%.

The self-adhesive mass was applied by thermal screen printing to the carrier, the self-adhesive mass being a hot-melt adhesive.

The composition of this hot-melt adhesive was as follows: an A-B/A-B-A block copolymer, composed of hard and soft segments, having a ratio of A-B-A to A-B of 2:1 and a styrene content of 13 mol % in the polymer; its proportion in the adhesive is 40% by weight (Kraton G)
hydrocarbon resins, with a proportion of 14.5% by weight (Super Resin HC 140)
an aging inhibitor, with a proportion of less than 0.5% by weight (Irganox).

The components employed were homogenized in a thermal mixer at 175° C.

The softening point of this adhesive was approximately 85° C. (DIN 52011), and the adhesive gave a viscosity of 2100 mPas at 150° C. (DIN 53018, Brookfield DV II, sp. 21). The glass transition temperature, by the method set out above, was −10° C.

The carrier material was coated directly at 4.2 m/min and at a temperature of 140° C. It was coated with 30 g/m², using a specially made screen stencil in a thickness of 200 µm. The design of this screen stencil was such that 50% of the domes of adhesive applied using it had a relatively great height and a somewhat flatter shape. Both dome geometries were distributed uniformly over the sheetlike structure, so that every higher dome was surrounded by lower domes.

Subsequently the self-adhesive mass applied by screen printing was coated partially, via a roller wetted with coating material, with a very thin layer of coating material. The pressure applied by the application roller was selected such that the coating material was partially transferred only to the tips of the higher domes, and hence only this region was partially deactivated.

Specifically, the carrier of the sheetlike structure had an 80% coverage of self-adhesive mass domes, of which 50% had a relatively great height and at the same time were coated at the tips so that 50% of their projection area was in deactivated form. Accordingly the overall sheetlike structure was deactivated to an extent of 20% (i.e., 80%*50%*50%).

The sheetlike structure produced by this process (self-adhesive tape or label) exhibited no tack at all and no bond strength under only gentle applied pressure. It could therefore be positioned precisely without trouble or problem even on sensitive substrates. The choice of the transparent product construction (carrier, self-adhesive mass, and coating material) made it possible, moreover, to perceive positioning marks, for example, through the adhesive tape. After applied pressure, in contrast, the bonding strength was high. As a result of the lower degree of deactivation than in example 1, there was a greater area of contact between self-adhesive mass and bonding substrate, and hence a higher bond strength. At the same time, air channels remained left between the individual domes, and guaranteed bubble-free application.

The invention claimed is:

1. A self-adhesive construct comprising a sheet structure and a self-adhesive mass on at least a portion of said sheet structure, wherein on a first areal layer of the sheet structure the self-adhesive mass is present in the form of a multiplicity of deformable geometric structures of varying heights, and some of the geometric structures having the greatest height have been treated such that the treated part of the surface exhibits a lower tack than untreated self-adhesive mass exhibits, whereas some of the geometric structures having the lowest height have not been so treated.

2. The self-adhesive construct of claim 1, wherein the first areal layer of the self-adhesive construct is a carrier material, in the form of a rigid or elastic film, foam, woven, paper, knitted, nonwoven or gel carrier, a coating-material layer or a layer of an adhesive.

3. The self-adhesive construct of claim 1, which has a multilayer composite construction.

4. The self-adhesive construct of claim 1, wherein the geometric structures are polygeometric domes.

5. The self-adhesive construct of claim 1, wherein the self-adhesive mass is a hot-melt adhesive.

6. The self-adhesive construct of claim 5, wherein the hotmelt adhesive is based on A-B or A-B-A block copolymers or blends thereof, and phase A is principally polystyrene or its derivatives and phase B is ethylene, propylene, butadiene, isoprene or mixtures thereof.

7. The self-adhesive construct of claim 1, wherein the self-adhesive mass is present on the first areal layer with a coatweight of 5 to 400 g/m².

8. The self-adhesive construct of claim 1, wherein the self-adhesive mass geometry on the first areal layer has been deactivated, relative to its projection area, to an extent of 15% to 75%.

9. The self-adhesive construct of claim 1, wherein some of the geometric structures have different shapes compared to other of the geometric structures.

10. The self-adhesive construct of claim 1, which in an adhesively bonded state comprises channels between the geometric structures of self-adhesive mass.

11. A method of bonding a self-adhesive construct comprising increasing the tack of the self-adhesive construct in stages to effect a bond between the self-adhesive construct and the substrate, wherein said increasing is brought about by applying a first pressure to the self-adhesive construct and thereafter applying a second pressure to self-adhesive construct, wherein the first pressure is less than the second pressure and where the self-adhesive construct comprises a sheet structure and a self-adhesive mass on at least a portion of said sheet structure, wherein on a first areal layer of the sheet structure the self-adhesive mass is present in the from of a multiplicity of deformable geometric structures of varying height, and some of the geometric structures having the greatest height have been treated such that the treated part of the surface exhibits lower tack than untreated self-adhesive mass exhibits, whereas some of the geometric structures having the lowest height have not been so treated.

* * * * *